US009020943B2

(12) United States Patent
Caldwell et al.

(10) Patent No.: US 9,020,943 B2
(45) Date of Patent: Apr. 28, 2015

(54) METHODS, SYSTEMS, AND COMPUTER PROGRAM PRODUCT FOR AUTOMATICALLY CATEGORIZING DEFECTS

(75) Inventors: Bob Caldwell, Buda, TX (US); Sandesh Rao, Foster City, CA (US); William Burton, Colorado Springs, CO (US); Joshua Ort, Rexford, NY (US); Mark Brewer-Tillotson, Monument, CO (US)

(73) Assignee: Oracle International Corporation, Redwood Shores, CA (US)

( * ) Notice: Subject to any disclaimer, the term of this patent is extended or adjusted under 35 U.S.C. 154(b) by 932 days.

(21) Appl. No.: 12/350,217

(22) Filed: Jan. 7, 2009

(65) Prior Publication Data

US 2010/0174691 A1 Jul. 8, 2010

(51) Int. Cl.
*G06F 17/30* (2006.01)

(52) U.S. Cl.
CPC ............................... *G06F 17/30598* (2013.01)

(58) Field of Classification Search
CPC ............................................... G06F 17/30598
See application file for complete search history.

(56) References Cited

U.S. PATENT DOCUMENTS

| 6,112,190 | A | 8/2000 | Fletcher et al. | |
|---|---|---|---|---|
| 6,377,898 | B1 * | 4/2002 | Steffan et al. | 702/82 |
| 7,007,038 | B1 * | 2/2006 | Kazemi | 1/1 |
| 7,107,261 | B2 * | 9/2006 | Farrett | 1/1 |
| 7,380,172 | B2 | 5/2008 | Srinivas | |
| 7,614,043 | B2 | 11/2009 | Ognev et al. | |
| 7,761,182 | B2 * | 7/2010 | Gallarda et al. | 700/121 |
| 7,861,226 | B1 * | 12/2010 | Episkopos et al. | 717/124 |
| 8,037,064 | B2 * | 10/2011 | Song et al. | 707/726 |
| 2005/0075841 | A1 * | 4/2005 | Peles et al. | 702/185 |
| 2005/0159909 | A1 * | 7/2005 | Lin | 702/83 |
| 2006/0173900 | A1 * | 8/2006 | Dhayalan et al. | 707/102 |
| 2007/0150084 | A1 * | 6/2007 | Grubb et al. | 700/110 |
| 2007/0276831 | A1 * | 11/2007 | O et al. | 707/7 |
| 2008/0103956 | A1 * | 5/2008 | Suzuki et al. | 705/37 |
| 2008/0114553 | A1 * | 5/2008 | Morel | 702/35 |
| 2009/0043660 | A1 * | 2/2009 | Lee | 705/14 |
| 2009/0222811 | A1 * | 9/2009 | Faus et al. | 717/173 |

(Continued)

OTHER PUBLICATIONS

Non-Final Office Action Mailed on Sep. 26, 2011 for U.S. Appl. No. 12/350,212.

(Continued)

*Primary Examiner* — Mohammad S Rostami
(74) *Attorney, Agent, or Firm* — Vista IP Law Group, LLP

(57) ABSTRACT

Disclosed are method(s), system(s), and computer program product(s) for automatically categorizing a defect into a category based at least on a keyword related to the defect. The method identifies information regarding the defect and identifies additional information related to categorizing the defect. The method identifies a keyword and determines whether the defect may be categorized into a category using the keyword. The method further comprises determining if the result of categorization is deterministic. In some embodiments, the method or the system further comprises associating a first score for categorizing the defect into the category based on the keyword and a second score for categorizing the defect into the category based on another keyword. In some embodiments, the method or the system further comprises identifying or determining a relationship between the first score and the second score with respect to the first category for the defect.

30 Claims, 8 Drawing Sheets

(56) References Cited

U.S. PATENT DOCUMENTS

2010/0077364 A1* 3/2010 Riviere-Cazeaux et al. ..... 716/4
2010/0131450 A1* 5/2010 Nguyen et al. .................. 706/54

OTHER PUBLICATIONS

Naouel Moha et al., "On the Automatic Detection and Correction of Software Architectural Defects in Object-Oriented Designs", 6th ECOOP workshop on Object-Oriented Reengineering, Jul. 26, 2005, Glasgow, Scotland.

S. Bibi et al., "Regression via Classification applied on software defect estimation", ScienceDirect, pp. 2091-2101, Department of Informatics, Aristotle University of Thessaloniki, 54124 Thessaloniki, Greece.

W.K. Chan et al., "Automatic goal-oriented classification of failure behaviors for testing XML-based multimedia software applications: An experimental case study", Journal of Systems and Software, 2006, pp. 602-612, Department of Computer Science, The University of Hong Kong, Pokfulam, Hong Kong.

Ron I. Kuper, "Dependency-Directed Localization of Software Bugs", Technical Report, May 10, 1989, MIT Artificial Intelligence laboratory.

Danilo Caivano et al., "Scaling up Distributed Software Inspections", University of Bari, Italy.

D. Richard Kuhn et al., "An Investigation of the Applicability of Design of Experiments to Software Testing", NASA/IEEE, Dec. 2002, National Institute of Standards and Technology Gaithersburg, MD 20899.

Yomi Kastro, "A Defect Prediction Method for Software Versioning", Graduate Program in Computer Engineering, 2004, Boğaziçi University.

Notice of Allowance and Fees Due Mailed on Mar. 13, 2012 for U.S. Appl. No. 12/350,212.

* cited by examiner

METHODS, SYSTEMS, AND COMPUTER PROGRAM PRODUCT FOR AUTOMATICALLY CATEGORIZING DEFECTS

CROSS-REFERENCE TO RELATED APPLICATION(S)

Certain aspects in some embodiments of this Application are related to and disclosed in U.S. application Ser. No. 12/350,212 which is entitled "METHODS, SYSTEMS, AND COMPUTER PROGRAM PRODUCT FOR IMPLEMENTING EXPERT ASSESSMENT OF A PRODUCT" and was filed on Jan. 7, 2009, the content of which is incorporated by reference in entirety in this Application.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Some embodiments of the invention relate to technologies for automatically classifying defects and issues. Some embodiments of the invention relate to method(s), system(s), and computer program product for implementing automatic defect fixes upgrade expert assessment technologies. Some embodiments relate to method(s), system(s), and computer program product(s) for automatic classification of defects and/or issues of a piece of software, hardware, or a combination of software and hardware.

Various embodiments as disclosed below use computer program(s) and/or software application(s) as examples for illustration purposes. These examples are presented for the ease of explanation and illustration and do not intend to limit the scope of various embodiments of the invention.

During a typical development cycle of a product such as a piece of computer software, developers and/or programmers often fix errors, mistakes, faults, failures, flaws, bugs, or undesirable features (collectively defects) as they are found during the development or maintenance cycle and distribute the fixes for such defects in the form of new versions or releases of the software or patches. For the software development team, it may be desirable to know the patterns or trends of the defects. For example, the product development or maintenance team may also be interested to know whether the defect of interest. For example, such patterns or trends of defects may be used so as to prioritize various tasks in the development or maintenance of the software and properly allocate resources accordingly. Such patterns or trends of defects may also be used for reporting purposes. Another use of such patterns or trends of defects is for continuous improvement of the software product and for quality assurance.

In order to better access information or data related to these defects, the details, metadata, bug report(s), and/or diagnostic data about these defects are often stored in some forms of data structures such as in database(s), table(s), spreadsheet(s), or list(s) (collectively database). The members of the software development or maintenance team often track, open, investigate, fix, and then close such defects by accessing such a database. Nonetheless, such information or data related to these defects are often stored in an unstructured manner format in this type of database. Here, such stored information or data may be "unstructured" even though they may characterized as structured as is commonly understood where the structure of such stored information or data is not sufficiently helpful for the desired debugging and bug-fixing tasks. What further clutter the storage of such information or data is that such information or data are often stored with other types of administrative data. This would further reduce the usefulness of such "databases" for these defects.

Often, such information or data may comprise dates, snippets of log and trace files, comments of engineers or customers, error messages generated by the software product, responses from customers, etc. Therefore, the developers or programmers have to go through a lot of information or data in order to properly assess the impact of a defect. Nonetheless, the impact of a defect may encompass one and more often several functional areas. Therefore, the software development or maintenance team needs to categorize each defect so as to prepare the information or data received for analysis to better understand the patterns or trends of defects.

On the other hand, categorization or classification of defects often require a substantial amount of time and effort of one or more skilled programmers or engineers in order to better understand the impact of the defect of interest and/or what functional area(s) is (are) affected. As a result, engineers often manually categorize such defects. Such a manual process is not only prone to error but also wastes a lot of resources.

To further exacerbate the problem with the aforementioned manual process, for large software project, there may exist many such defects which need to analyzed and/or fixed. This further hinders the aforementioned manual process for categorizing the defects.

In addition, even if the aforementioned manual process were to be possible the result of the categorization may change over time as new defects are found which may change the patterns or trends that are previously determined based on old defects. Therefore, the engineers may be required to repeatedly perform successive passes over time in order to correctly categorize the defects and to generate correct patterns or trends of the defects of the software product. This requirement of repeated performance of successive passes thus renders the manual process of the defects even more unlikely.

In addition to the categorization and assessment of patterns or trends of defects, the fixes of the defects may often be incorporated into future releases of the products. The fixes of the defects may also be incorporated into one or more patches to provide the fixes to the current installed base which may be widespread among many customers using different versions of the product on different platforms such as some hardware like computers and/or concurrently running software like operating systems.

Similarly, as time elapses and new releases of the software product are released, customers of the current installed base may desire or may be encouraged to adopt new versions of the software product for various reasons. For example, the customers may decide to adopt the new releases to take advantage of the new features and functionality of the new releases. As another example, the customers may decide to adopt the new releases because the support or warranty for their existing versions may be expiring. Often, these customers may have already had patches applied to their current versions of the software product. These customers usually engage in upgrade planning where the customers decide to change to a newer version of the software product on possibly different platforms running possibly different operation systems from their current ones.

Such an upgrade planning is of critical importance because it may eliminate unnecessary downtime and loss of productivity. For the upgrade planning, the customers may need to be able to determine what patch(es) they have already installed. The customers may need to determine what defects have not been fix on their current installed base for which fixes are available in certain versions of the patch(es). The customers may also need to determine what defects are not fixed yet so no patch is available. The customers may also wish to know what defects have already been fixed in the desired releases on their target platforms running certain operating systems.

The customers may also wish to know what defects have been fixed, but there are currently no patches available for their current choice of platforms and operation systems. Note that patches for defects are often produced on an as needed basis and may not be uniformly available for all versions and platform/operation system at the same time. Generally, the more defects to be fixed the longer the lead-time may be. Also, the more combinations of platforms and operation systems to apply the patches to the longer the lead-time may be. This information may be important to the customers because there may be a lead-time associated with the requesting, building, and distributing patches to fix certain defects for a particular platform running a particular operating system. This lead-time information may be crucial for the customers' upgrade planning.

Currently, it is almost necessary for customers to submit their inventory of patches and perhaps context information in a form of a request such as a service request for a formal analysis or to some support personnel such as product support engineers or customer support engineers for an informal analysis to determine the status of patches in the target version(s) of the product(s) and the combination(s) of platform and operating system that the customers would like to adopt. A customer often considers one or more target versions of the product and one or more combinations of the platform and operating system as a part of the upgrade strategy. Nonetheless, the current formal analysis in response to a service request or informal analysis by the support personnel is time consuming and expensive. These analyses are also prone to human error, and the results are typically highly dependent upon the level of skills of the support personnel for, for example, interpreting possibly conflicting or ambiguous data regarding the availability of fixes and patches.

Therefore, there exists a need for a method, system, and computer program product for automatically classifying defects. There also exists a need for a method, system, and computer program product for analyzing and reporting patch status.

SUMMARY

What is disclosed is a method, system, or a computer program product for automatically classifying defects of a product. The method comprises identifying a first information regarding a first defect; identifying or receiving additional information from a database, wherein the additional information is related to an act of categorizing the defect into a category; identifying a first keyword for the first defect based at least in part upon the first information; determining whether the first defect may be categorized into the first category using the first keyword; and displaying a result of an act of determining whether the first defect may be categorized into the first category or storing the result in a computer readable medium.

DESCRIPTION OF FIGURES

The drawings illustrate the design and utility of preferred embodiments of the present invention. It should be noted that the figures are not drawn to scale and that elements of similar structures or functions are represented by like reference numerals throughout the figures. In order to better appreciate how the above-recited and other advantages and objects of the present inventions are obtained, a more particular description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
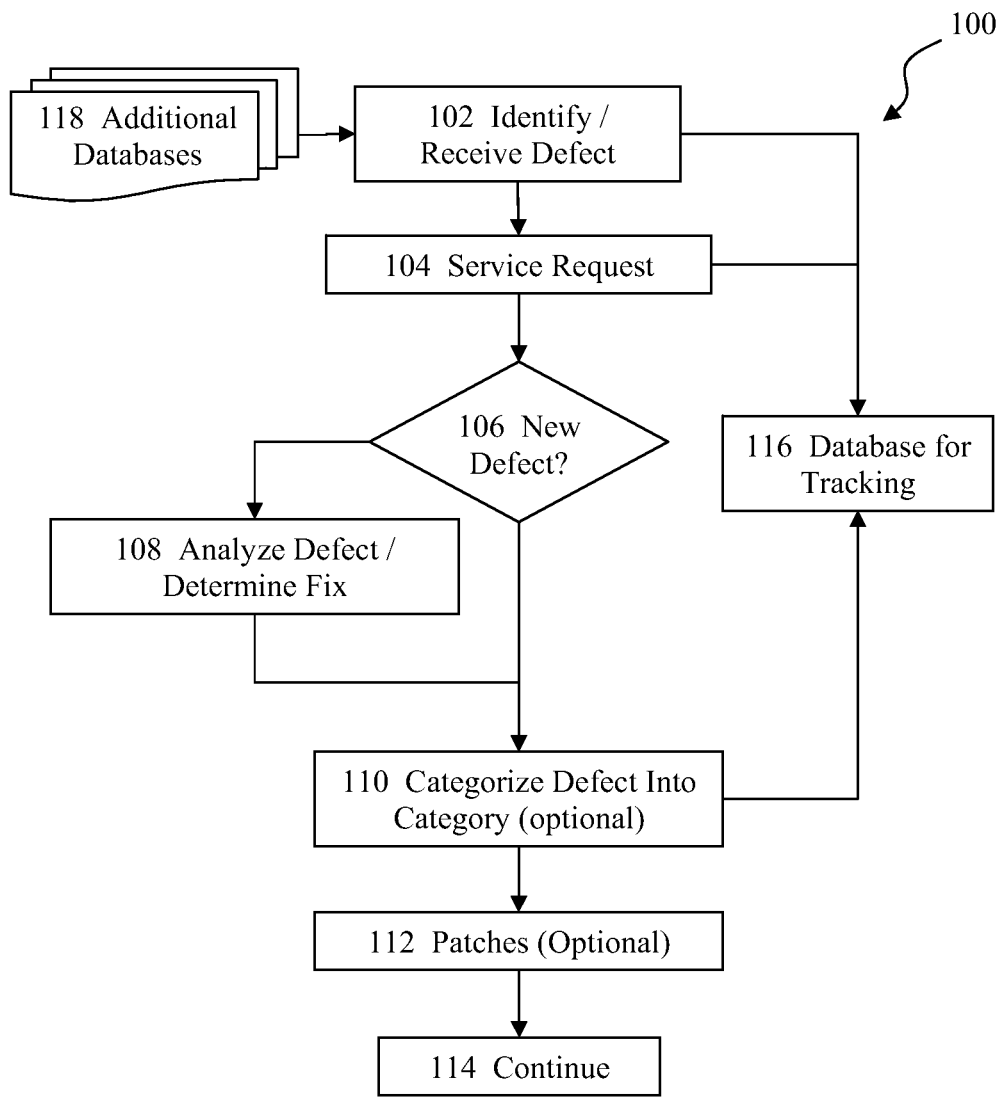
FIG. 1 illustrates a high level block diagram for the method or system for automatically categorizing defects.

Various embodiments described in the Specification use examples involving a computer software product merely for the ease of explanation or for illustration purposes and do not intend to limit the scope of various embodiments to computer software product only. One of ordinary skills in the art would clearly understand that the written description of various embodiments herein may also be applied to other types of products while achieving identical or substantially similar purposes.

Various embodiments of the invention which are directed to an improved method, system, and computer program product for automatically categorizing a defect of a product into one or more categories based on an information of the defect.

Disclosed are method(s), system(s), and computer program product(s) for automatically categorizing a defect into a category based at least on a keyword related to the defect. In some embodiments, the method or the system identifies an information regarding the defect and identifies or receives additional information related to categorizing the defect. In some embodiments, the method or the system identifies a keyword for the defect based on the first information and determines whether the defect may be categorized into a category using the keyword.

In some embodiments, the method or the system further comprises determining whether the result of categorization is deterministic. In some embodiments, the method or the system further comprises associating a first score for categorizing the defect into the category based on the keyword and a second score for categorizing the defect into the category based on another keyword. In some embodiments, the method or the system further comprises identifying or determining a functional describing a relationship between the first some and the second score with respect to the first category for the defect. Disclosed are method(s), system(s), and computer program product(s) for automatically categorizing a defect into a category based at least on a keyword related to the defect.

In some embodiments, the method or the system identifies an information regarding the defect and identifies or receives additional information related to categorizing the defect. In some embodiments, the method or the system identifies a keyword for the defect based on the first information and determines whether the defect may be categorized into a category using the keyword. In some embodiments, the method or the system further comprises determining whether the result of categorization is deterministic. In some embodiments, the method or the system further comprises associating a first score for categorizing the defect into the category based on the keyword and a second score for categorizing the defect into the category based on another keyword. In some embodiments, the method or the system further comprises identifying or determining a functional describing a relationship between the first some and the second score with respect to the first category for the defect.

Referring to FIG. 1 which illustrates a high level block diagram for the method or system for automatically categorizing defects. At 102, the method or the system for automatically classifying a defect into a category identifies or receives information or data about one or more defects of a product in some embodiments. In some embodiments, the information or the data about one or more defects of a product may be identified or received in the form of a service request or a defect report of any form, 104. In some embodiments, the information or the data about the one or more defects of a product may be identified or received in the form of a description of the symptoms of the client's system as a result of the one or more defects.

In some embodiments, the information or the data about one or more defects comprise metadata about the one or more defects. In some embodiments, the information or the data about one or more defects comprise diagnostic information or data of the one or more defects. In some embodiments, the information or the data about one or more defects comprise context information related to the one or more defects which comprises, for example but not limited to, information about the platform(s) on which the one or more defects are found, or information about the operating system(s) together with which the product is executed in some embodiments (collectively context information.)

In some embodiments, the context information may further comprise one or more target platforms on which either the current version(s) of the product or one or more different versions or releases of the product are to be executed. In some embodiments, the context information may further comprise one or more target versions of the operation system(s) together with which the product is to be executed. In some embodiments, the information or the data about one or more defects comprise additional details about the one or more defects which comprises, for example but not limited to, date(s) of the one or more details, snippets of one or more log records, trace file(s) or record(s), engineer comment(s), error message(s) received, or response(s) of customer(s) in some embodiments.

At 118, the method or the system for automatically classifying a defect into a category accesses one or more additional databases for additional input in some embodiments. In various embodiments, the one or more additional databases may comprise database(s), table(s), list(s), or any other form of data structure(s) (collectively database) for the intended purposes of storing information. In some embodiments, the one or more additional databases may comprise one or more separate databases. In some embodiments, the one or more additional databases may be part of the method or the system for automatically classifying a defect into a category.

In some embodiments, the one or more databases comprise one or more keyword databases which comprise a plurality of keywords which may be used to determine whether a particular defect is to be categorized into a certain category. In some embodiments, the one or more databases comprise one or more category databases which comprise a plurality of categories into which a defect is to be categorized. In some embodiments, the method or the system for automatically classifying a defect into a category further comprises a mapping between a keyword and a category. In various embodiments, the mapping may comprise a lookup table, a database, or any other form of information correlating a keyword to a category.

In some embodiments, the one or more databases comprise a rule base or a knowledge base which further comprises one or more inference rules which may be used to mimic a decision logic process or system, a decision of an expert, or an expert reasoning process in determining whether or not a defect is to be categorized into a particular category. In some embodiments, only the one or more databases comprise defect related expertise or expert knowledge but not in the program(s). In these embodiments, when the method or the system for automatically classifying a defect into a category does not produce desired results, the method or the system begins to expand the one or more databases rather than to reprogram or modify other programs.

In some embodiments, the method or the system for automatically classifying a defect into a category processes a plurality of values for any problem parameters and pursues more than one expert reasoning process for a determination of categorization of a defect into a category. In some embodiments, the method or the system for automatically classifying a defect into a category presents a result of incomplete or not fully determined reasoning of the act of determining whether a defect may be categorized into a category.

In some embodiments, the one or more databases may comprise different objects or other types of allocated region of storage which comprise, for example, but not limited to, one or more classes of questions. In some embodiments, the question may comprise, for example, "is defect #1 to be categorized into category #1?"

The different objects or other types of allocated region of storage may also comprise one or more parameters in some embodiments, where a parameter may be a place holder for a character string which may be a variable that can be inserted into one or more classes of questions at the point where the parameter is positioned. In some embodiments, the different objects or other types of allocated region of storage may also comprise procedures, processes, or definitions of calls to other external procedures or processes. In some embodiments, the different objects or other types of allocated region of storage may also comprise one or more nodes within a tree structure which indicates some rules or logic which mimics human expert reasoning.

In some embodiments, the method or the system for automatically classifying a defect into a category may employ a problem solving process or system in which the defect related expertise or expert knowledge is embedded within such problem solving system and in the one or more databases. In these embodiments, the method or the system for automatically classifying a defect into a category may begin to reprogram the programs and/or to expand the one or more databases where the method or system is found to produce undesirable result(s).

At 106, the method or the system for automatically classifying a defect into a category determines whether or not the defect identified or received at 102 or 104 constitutes a new defect which constitutes a defect that has not been identified based upon the information or data from 102, 104, and 118. For example, a defect which has been identified for product version 2 running on platform A with operation system B may still constitute a new defect if such a defect has not been reported, identified, or received for product version 2 running on platform A with operation system C.

In some embodiments where the method or the system for automatically classifying a defect into a category determines that the defect identified or received at 102 or 104 constitutes a new defect, the method or the system analyzes the defect and determines the status of fix(es) for the defect at 108. In some embodiments, the method or the system for automatically classifying a defect into a category analyzes the information related to the defect which comprises the metadata, diagnostic data, bug report(s), or service request.

In some embodiments, the method or the system for automatically classifying or categorizing a defect into a category further analyzes the context information or customers' inventory of patches and determines the status of fix(es) for the defect. In some embodiments, the status of the fixes comprises a status indicative of a defect which has been fixed in one or more prior releases or versions or patches. In some embodiments, the status of the fixes comprises a status indicative of a defect for which one or more releases or versions or patches are available. In some embodiments, the status of the fixes comprises a status indicative of a defect which has not been fixed in currently available releases or versions or patches, but a fix will be available in one or more future releases, versions, or patches.

In some embodiments, the status of the fixes comprises a status indicative of a defect which has not been fixed in currently available releases or versions or patches, and no fix has been planned or worked on to ensure the availability of such a fix in a future release, version, or patch. In some embodiments, the status of the fixes comprises a status indicative of a defect for which the method or the system is unable to reach a definitive determination as to the status of the fix. In some embodiments, the status of the fixes comprises a status indicative of a defect which is no longer a bug based on the target version of the product, the target platform, and/or target operating system.

In these embodiments where the method or the system for automatically classifying a defect into a category determines or identifies that the defect identified or received at 102 or 104 constitutes a new defect at 106 and then analyzes the defect and determines the status of the fix at 108, the method or the system then proceeds to 110 to categorize the defect into a category. In some embodiments, the category comprises a functional group. In some embodiments, a category comprises one or more defects.

In some embodiments where the method or the system for automatically classifying a defect into a category determines that the defect identified or received at 102 or 104 does not constitute a new defect, the method or the system proceeds to 110 to categorize the defect into a category.

At 112, the method or the system for automatically classifying a defect into a category may optionally proceed to generate a list of one or more patches for the defect based upon the information received in some embodiments. In some embodiments, the method or the system for automatically classifying a defect into a category may, depending upon the configuration of the system from which the defect is identified, further transmit the patches to the system to fix the patch. In some embodiments, the method or the system for automatically classifying a defect into a category causes a message to be transmitted to the system from which the defect is identified to notify the system's administrator or user that one or more patches are available.

In some embodiments, the method or the system for automatically classifying a defect into a category causes the defect identified or received at 102 to be stored in a database, 116. In some embodiments, the database storing such identified or received defects is used for tracking purposes. In some embodiments, the method or the system for automatically classifying a defect into a category causes the service request which comprises information about the defect to be stored in the same database at 116 or in a different database. In some embodiments, the method or the system for automatically classifying a defect into a category causes the determined or identified category to be stored in the same database at 116 or in a different database.

Figure 2:
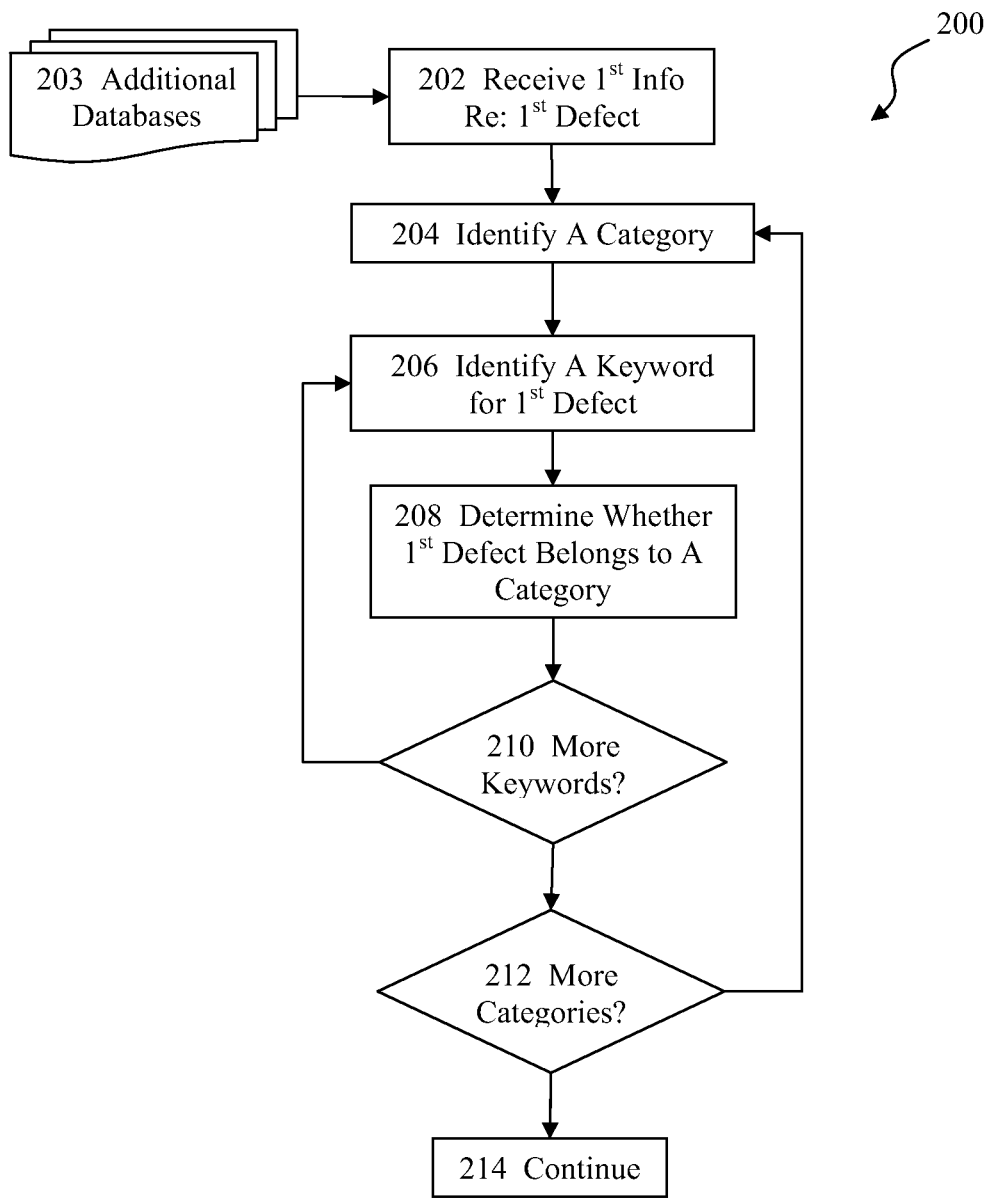
FIG. 2 illustrates another high level block diagram for the method or system for automatically categorizing defects into one or more categories based at least upon one or more keywords.

Referring to FIG. 2 which another high level block diagram for the method or system, 200, for automatically categorizing defects into one or more categories based at least upon one or more keywords. At 202, the method or the system for automatically classifying a defect into a category receives a first information regarding a first defect in some embodiments. In some embodiments, the first information regarding the first defect comprises the context information which comprises, for example but not limited to, information about the platform(s) on which the one or more defects are found, or information about the operating system(s) together with which the product is executed in some embodiments. In some embodiments, the first information comprises metadata, details, bug reports, diagnostic data, or other details about the first defect in addition to or instead of the context information.

At 203, the method or the system for automatically classifying a defect into a category accesses one or more additional databases for additional input in some embodiments. In various embodiments, the one or more additional databases may comprise database(s), table(s), list(s), or any other form of data structure(s) (collectively database) for the intended purposes of storing information. In some embodiments, the one or more additional databases may comprise one or more separate databases. In some embodiments, the one or more additional databases may be part of the method or the system for automatically classifying a defect into a category.

In some embodiments, the one or more databases comprise one or more keyword databases which comprise a plurality of keywords which may be used to determine whether a particular defect is to be categorized into a certain category. In some embodiments, the one or more databases comprise one or more category databases which comprise a plurality of categories into which a defect is to be categorized. In some embodiments, the method or the system for automatically classifying a defect into a category further comprises a mapping between a keyword and a category. In various embodiments, the mapping may comprise a lookup table, a database, or any other form of information correlating a keyword to a category.

At 204, the method or the system for automatically classifying a defect into a category identifies a category identifies a first category. In some embodiments, the first category may be identified from a plurality of categories or a plurality of functional groups. In some embodiments, the method or the system for automatically classifying a defect into a category identifies a first keyword for the first defect at 206. In some embodiments, the method or the system for automatically classifying a defect into a category identifies the first keyword by analyzing the first information received or identified at 202.

At 208, the method or the system for automatically classifying a defect into a category determines whether the first defect is to be categorized into the first category in some embodiments. In some embodiments, the method or the system for automatically classifying a defect into a category may identify a threshold weight or a threshold score for a keyword with respect to a category above which the keyword is to be categorized into the category. In some embodiments, the threshold weight or the threshold score for a keyword may be determined based on an analysis of one or more attributes or characteristics of the category.

In some embodiments, the threshold weight or the threshold score for a keyword may be determined based on an analysis of one or more attributes or characteristics of the defects which have been categorized into the category. In some embodiments, the analysis may be based at least in part upon one or more historical analyses and/or one or more statistical analyses. For example, the method or the system for automatically classifying a defect into a category may determine that any keyword with a weight or score above 100 is to be categorized into the first category in some embodiments.

In some embodiments, the method or the system for automatically classifying a defect into a category makes such a determination based at least in part upon the first keyword. In some embodiments, the method or the system for automatically classifying a defect into a category further comprises a mapping between the first keyword and the first category. In some embodiments, the mapping may comprise a lookup table, a database, or any other form of information correlating a keyword to a category.

In some embodiments, the method or the system for automatically classifying a defect into a category may loop back to 206 to identify one or more additional keywords for the first defect and determine whether the first defect is to be categorized into the first category. For example, the method or the system for automatically classifying a defect into a category may not reach a definitive determination as to whether or not the first defect is to be categorized into the first category based solely upon the first keyword in some cases. In these cases, the method or the system for automatically classifying a defect into a category may require additional keywords to further determine whether the first defect should be categorized into the first category. More details will be described below for the action of determining whether or not the first defect should be categorized into the first category.

At 212, the method or the system for automatically classifying a defect into a category determines whether there are more categories into which the first defect may be categorized in some embodiments. If the method or the system for automatically classifying a defect into a category determines that there are more categories the method or the system loops back to 204 to identify the next category and repeats the actions between 204 and 212 as described until all categories or all desired categories are examined in some embodiments. At 214, the method or the system for automatically classifying a defect into a category continues and proceeds with further actions.

Figure 3:
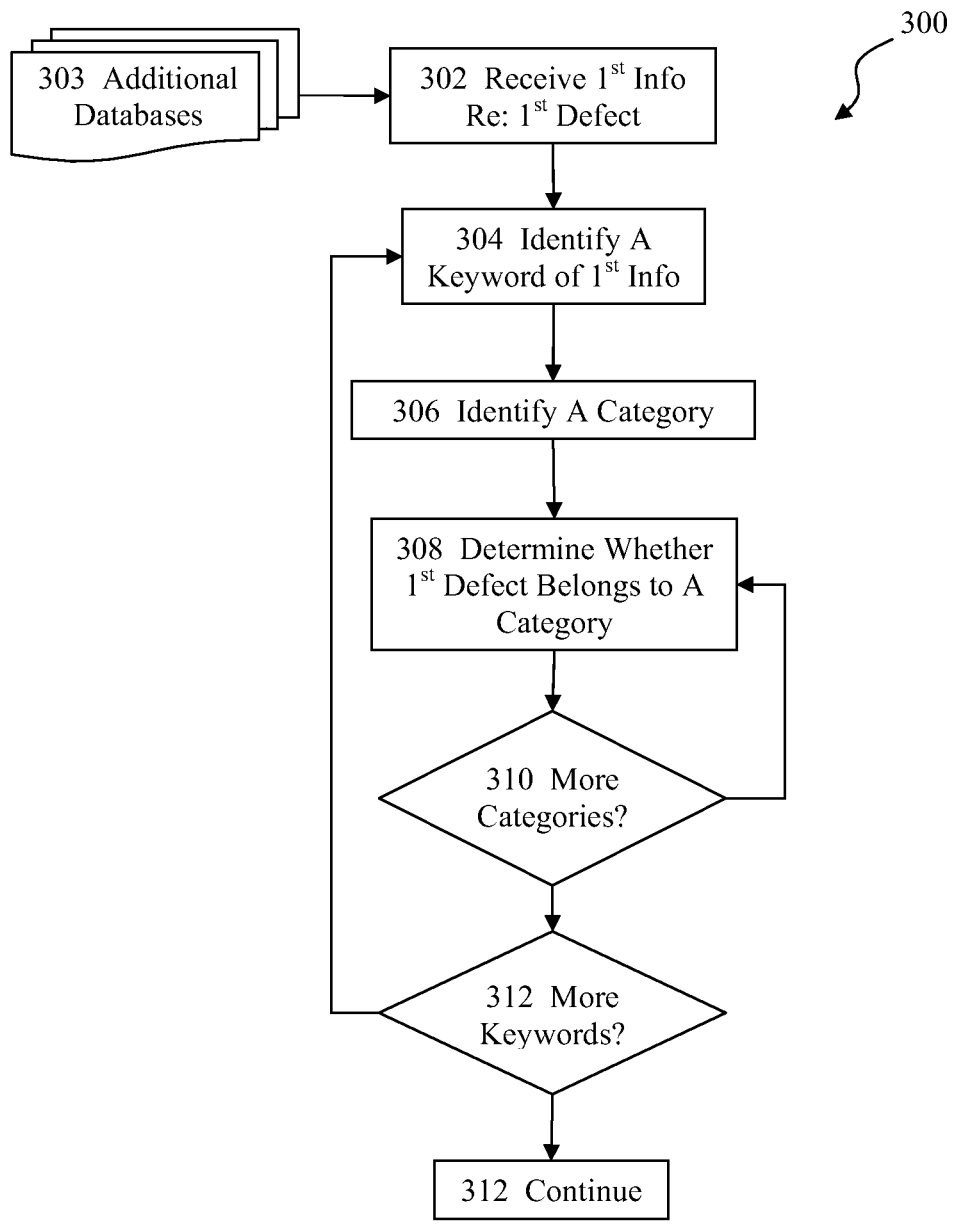
FIG. 3 illustrates another high level block diagram for the method or system for automatically categorizing defects into one or more categories based at least upon one or more keywords.

Referring to FIG. 3 which illustrates another high level block diagram for the method or system for automatically categorizing defects into one or more categories based at least upon one or more keywords. At 302, the method or the system for automatically classifying a defect into a category identifies or receives a first information regarding a first defect in some embodiments. In some embodiments, the first information regarding the first defect comprises the context information which comprises, for example but not limited to, information about the platform(s) on which the one or more defects are found, or information about the operating system(s) together with which the product is executed in some embodiments. In some embodiments, the first information comprises metadata, details, bug reports, diagnostic data, or other details about the first defect in addition to or instead of the context information.

At 303, the method or the system for automatically classifying a defect into a category accesses one or more additional databases for additional input in some embodiments. In various embodiments, the one or more additional databases may comprise database(s), table(s), list(s), or any other form of data structure(s) (collectively database) for the intended purposes of storing information. In some embodiments, the one or more additional databases may comprise one or more separate databases. In some embodiments, the one or more additional databases may be part of the method or the system for automatically classifying a defect into a category.

In some embodiments, the one or more databases comprise one or more keyword databases which comprise a plurality of keywords which may be used to determine whether a particular defect is to be categorized into a certain category. In some embodiments, the one or more databases comprise one or more category databases which comprise a plurality of categories into which a defect is to be categorized. In some embodiments, the method or the system for automatically classifying a defect into a category further comprises a mapping between a keyword and a category. In various embodiments, the mapping may comprise a lookup table, a database, or any other form of information correlating a keyword to a category.

At 304, the method or the system for automatically classifying a defect into a category identifies a first keyword for the first defect. In some embodiments, the method or the system for automatically classifying a defect into a category identifies a first keyword based at least in part upon the first information received or identified at 302. At 306, the method or the system for automatically classifying a defect into a category identifies a first category for classification in some embodiments. At 308, the method or the system for automatically classifying a defect into a category determines whether or not the first defect is to be categorized into the first category in some embodiments. In some embodiments, the method or the system for automatically classifying a defect into a category makes such a determination based at least in part upon the first keyword of the first defect.

At 310, the method or the system for automatically classifying a defect into a category determines whether or not there are more categories into which the first defect is to be categorized based at least in part upon the first keyword of the first defect. In these embodiments where the method or the system for automatically classifying a defect into a category determines that there is at least one more category to determine whether or not the first defect is to be categorized into, the method or the system then loops back to 308 to identify the next category to determine whether or not the first defect is to be categorized into the next category based at least in part upon the first keyword.

In these embodiments where the method or the system for automatically classifying a defect into a category determines that there is no more category to determine whether or not the first defect is to be categorized into, the method or the system proceeds to 312 to determine whether there is at least one more keyword for the first defect for the purpose of categorization. The method or the system for automatically classifying a defect into a category then proceeds to identify the next keyword and repeats the actions between 304 and 312 until there is no more keyword to be examined in some embodiments. Once the method or the system for automatically classifying a defect into a category determines that there is no more keyword to be examined, the method or the system proceeds to 312 and continues.

Figure 4:
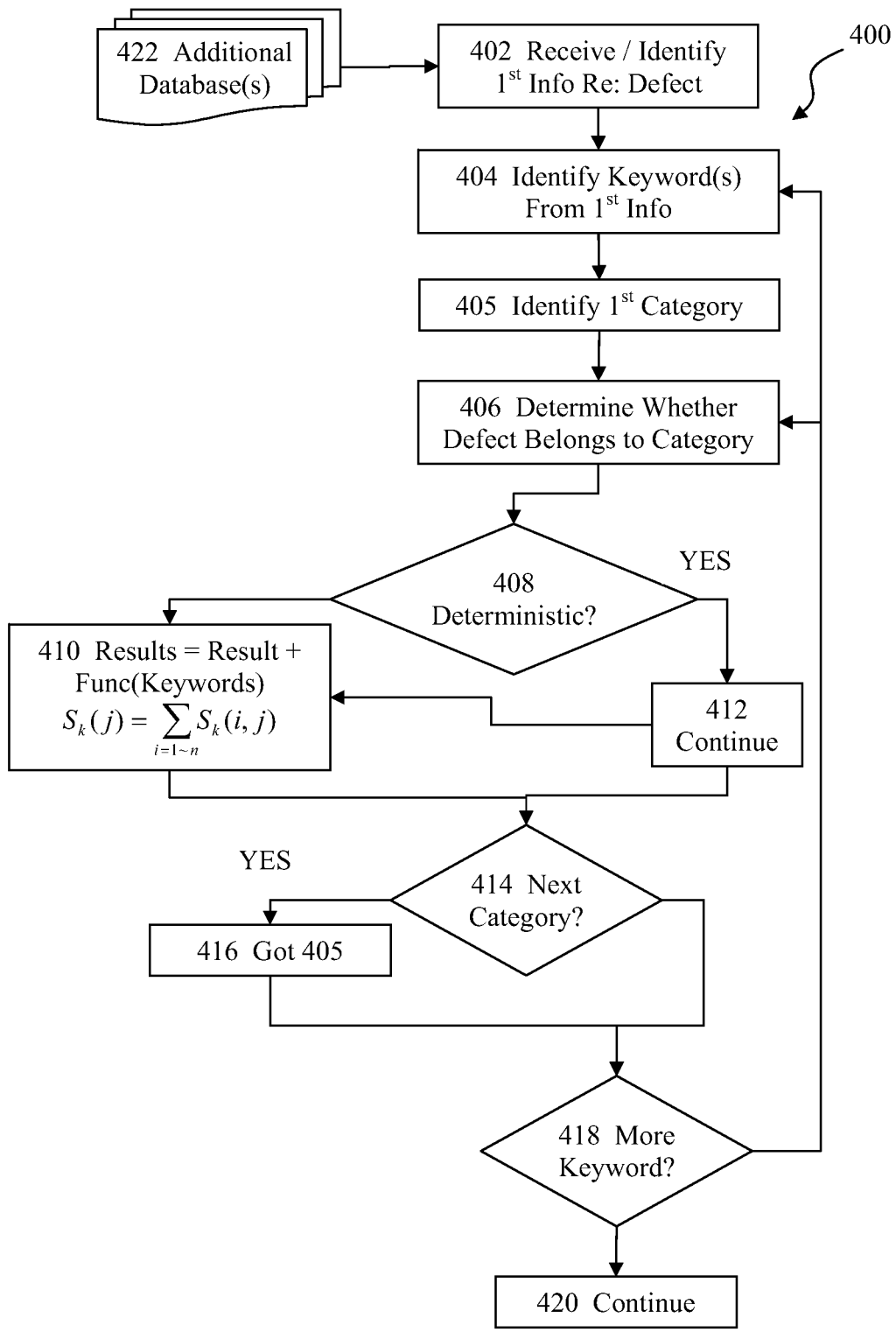
FIG. 4 illustrates more details about the method or system for automatically categorizing defects into one or more categories based at least upon one or more keywords.

Referring to FIG. 4 which illustrates more details about the method or system for automatically categorizing defects into one or more categories based at least upon one or more keywords. At 402, the method or the system for automatically classifying a defect into a category receives a first information regarding a first defect in some embodiments. In some embodiments, the first information regarding the first defect comprises the context information which comprises, for example but not limited to, information about the platform(s) on which the one or more defects are found, or information about the operating system(s) together with which the product is executed in some embodiments. In some embodiments, the first information comprises metadata, details, bug reports, diagnostic data, or other details about the first defect in addition to or instead of the context information.

At 422, the method or the system for automatically classifying a defect into a category accesses one or more additional databases for additional input in some embodiments. In various embodiments, the one or more additional databases may comprise database(s), table(s), list(s), or any other form of data structure(s) (collectively database) for the intended purposes of storing information. In some embodiments, the one or more additional databases may comprise one or more separate databases. In some embodiments, the one or more additional databases may be part of the method or the system for automatically classifying a defect into a category.

In some embodiments, the one or more databases comprise one or more keyword databases which comprise a plurality of keywords which may be used to determine whether a particular defect is to be categorized into a certain category. In some embodiments, the one or more databases comprise one or more category databases which comprise a plurality of categories into which a defect is to be categorized. In some embodiments, the method or the system for automatically classifying a defect into a category further comprises a mapping between a keyword and a category. In various embodiments, the mapping may comprise a lookup table, a database, or any other form of information correlating a keyword to a category.

At 404, the method or the system for automatically classifying a defect into a category identifies a first keyword for the first defect based at least in part on the first information in some embodiments. At 405, the method or the system for automatically classifying a defect into a category identifies a first category for categorization. At 406, the method or the system for automatically classifying a defect into a category determines whether or not the first defect is to be categorized into the first category based at least in part upon the first keyword in some embodiments.

At 408, the method or the system for automatically classifying a defect into a category determines whether or not the categorization determination action at 406 reaches a deterministic result in some embodiments. That is, the method or the system for automatically classifying a defect into a category determines whether or not the first defect is definitively categorized into the first category in these embodiments. In the embodiments where the method or the system for automatically classifying a defect into a category determines that the categorization of the first defect at 408 is deterministic, the method or the system then proceeds to 412 to continue subsequent actions. In the embodiments where the method or the system for automatically classifying a defect into a category determines that the categorization of the first defect at 408 is not deterministic, the method or the system for automatically classifying a defect into a category associates a score or a weight with the result of the determination action 406 based on the first keyword in some embodiments at 410.

In some embodiments, the associated score or weight is specific to the keyword and the category. That is, in these embodiments, the method or the system for automatically classifying a defect into a category may define the score or the weight to be R(i, j) where i denotes the i-th keyword, and j denotes the j-th category. The method or the system for automatically classifying a defect into a category then proceeds to 414 in some embodiments.

At 414, the method or the system for automatically classifying a defect into a category to determine whether or not there exists at least one more category to determine whether the first defect should be categorized into it based upon the first keyword in some embodiments. In embodiments where the method or the system for automatically classifying a defect into a category determines that there exists no more category to determine whether the first defect is to be categorized into it based at least in part upon the first keyword, the method or the system proceeds to 418. In embodiments where the method or the system for automatically classifying a defect into a category determines that there exists at least one more category to determine whether or not the first defect is to be categorized into it, the method or the system loops back to 405 to identify a second category. In these embodiments, the method or the system for automatically classifying a defect into a category repeats the actions from 405 to 416 for the first keyword of the first defect and the second category.

At 418, the method or the system for automatically classifying a defect into a category determines whether there exists at least one more keyword which may be used to categorize the first defect, the method or the system loops back to 404 to identify a second keyword in some embodiments. In some embodiments, the method or the system for automatically classifying a defect into a category then iterates through each category in the additional databases 422 by first identifying a first category at 405 and then determining whether the first defect is to be categorized into the first category based upon the second keyword at 406.

In some embodiments, the method or the system for automatically classifying a defect into a category then determines whether a result of the act of determining at 406 is deterministic at 408 in some embodiments. In some embodiments where the method or the system for automatically classifying a defect into a category determines that the result of the act of determining at 406 is deterministic, the method or the system proceeds to 412 and continues. Nonetheless, starting from the second keyword, the method or the system for automatically classifying a defect into a category proceeds from 412 to 410 and associates a score or a weight with the result of the act of determining at 406 based on the second keyword for the currently identified category and then adds the score or the weight for the act of determining at 406 for each of the categories identified at 405 with respect to the currently identified keyword to the score or weight for the act of determining at 406 for the same category previously identified in the previous iteration at 405 with respect to the previously identified keyword.

To further illustrate the addition of the scores or weights, it is assumed that the currently identified keyword at 404 is $KW_{i+1}$ and that the previously identified keyword at 404 is $KW_i$ for a defect $D_k$. It is further assumed that the act of determining whether $D_i$ is to be categorized into category $CAT_j$ is determined to be non-deterministic. It is also assumed that the score or weight for the act of determining whether $D_k$ is to be categorized to $CAT_j$ based upon $KW_i$ is $S_k(i, j)$. During the next iteration where the identified keyword is $KW_{i+1}$, the score or weight for the act of determining whether $D_k$ is to be categorized to $CAT_j$ based upon $KW_{i+1}$ is $S_k(i+1, j)$. In some embodiments where the method or the system for automatically classifying a defect into a category determines that the result of the act of determining whether $D_k$ is to be categorized into $CAT_j$ is deterministic, the method or the system proceeds to 410 from 412 to add the score or weight.

That is, the method or the system for automatically classifying a defect into a category proceeds from 412 to 410 to perform $S_k(i)=S_k(i,j)+S_k(i+1,j)$, or in a more general form $$S_k(j) = \sum_{i=1 \sim n} S_k(i, j),$$

even when the method or the system determines that the result of the act of determining whether defect $D_k$ is to be categorized into $CAT_j$ based upon $KW_{i+1}$ is deterministic. After the method or the system for automatically classifying a defect into a category perform the summation at 410, the method or the system may optionally determine whether the resultant score or resultant weight of the act of 410 would cause the defect, $D_k$, to be categorized into category, $CAT_j$ the in some embodiments. In some embodiments where the method or the system for automatically classifying a defect into a category determines that the resultant score or resultant weight causes the defect, Dk, to be categorized into category, $CAT_j$, the method or system stops the current iteration for $CAT_j$ and proceeds to the other categories to determine whether or not the defect, $D_k$, is to be categorized into each of the remaining categories by performing similar actions as described above.

In some embodiments where the method or the system for automatically classifying a defect into a category determines that the result of the act of determining whether the defect, $D_k$, is to be categorized into the category, $CAT_j$, based on the currently identified keyword, $KW_{i-1}$, at 406 is non-deterministic, the method or the system for automatically classifying a defect into a category proceeds to 410 and associates a score or a weight with the result of the act of determining at 406 based on the keyword, $KW_{i-1}$, for the currently identified category, $CAT_j$, and then adds the score or the weight, $S_k(i+1,j)$, for the act of determining at 406 for each of the categories identified at 405 with respect to the currently identified keyword, $KW_{i+1}$, to the score or weight, $S_k(i,j)$, for the act of determining at 406 for the same category previously identified, $CAT_j$, in the previous iteration at 405 with respect to the previously identified keyword, $KW_i$ as similarly described in the preceding paragraph.

After the method or the system for automatically classifying a defect into a category determines that there exists no more keyword to be analyzed for the currently identified and received defect (402), the method or the system proceeds to 420 to continue subsequent actions.

Figure 5:
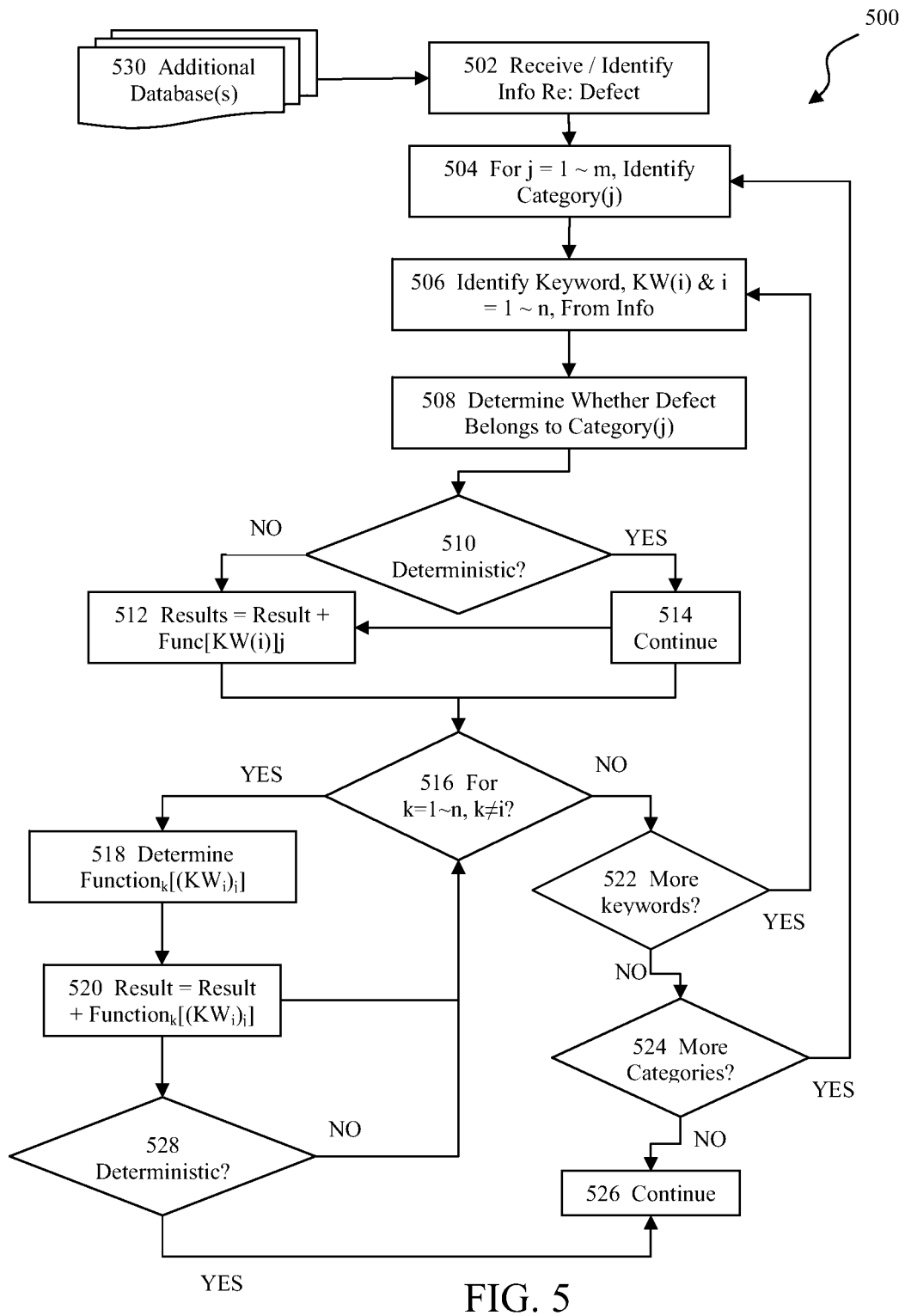
FIG. 5 illustrates more details about the method or system for automatically categorizing defects into one or more categories based at least upon one or more keywords.

Referring to FIG. 5 which illustrates more details about the method or system, 500, for automatically categorizing defects into one or more categories based at least upon one or more keywords. At 502, the method or the system for automatically classifying a defect into a category receives or identifies a first information regarding a defect in some embodiments.

At 530, the method or the system for automatically classifying a defect into a category accesses one or more additional databases for additional input in some embodiments. In various embodiments, the one or more additional databases may comprise database(s), table(s), list(s), or any other form of data structure(s) (collectively database) for the intended purposes of storing information. In some embodiments, the one or more additional databases may comprise one or more separate databases. In some embodiments, the one or more additional databases may be part of the method or the system for automatically classifying a defect into a category.

In some embodiments, the one or more databases comprise one or more keyword databases which comprise a plurality of keywords which may be used to determine whether a particular defect is to be categorized into a certain category. In some embodiments, the one or more databases comprise one or more category databases which comprise a plurality of categories into which a defect is to be categorized. In some embodiments, the method or the system for automatically classifying a defect into a category further comprises a mapping between a keyword and a category. In various embodiments, the mapping may comprise a lookup table, a database, or any other form of information correlating a keyword to a category.

At 504, the method or the system for automatically classifying a defect into a category iteratively identifies, in some embodiments, a category, $CAT_j$, from a plurality of categories, $CAT_j$, where j=1~m, and m is an integer. At 506, the method or the system for automatically classifying a defect into a category iteratively identifies, in some embodiments, a keyword, $KW_i$, from one or more keywords, $KW_i$, where i=1~n, and n is an integer.

In some embodiments, the method or the system for automatically classifying a defect into a category determines whether the defect, $D_k$, is to be categorized into the category, $CAT_j$, based at least in part on the keyword, $KW_i$, at 508. In some embodiments, the method or the system for automatically classifying a defect into a category determines whether the result of the act of determining at 508 is deterministic at 510. In some embodiments where the method or the system for automatically classifying a defect into a category determines that the result of the act of determining at 508 is deterministic at 510, the method or the system proceeds to 514 to continue to perform subsequent actions.

In some embodiments, where the method or the system for automatically classifying a defect into a category determines that the result of the act of determining at 508 is non-deterministic at 510, the method or the system associates a score or weight, $S_k(i, j)$, with the result of the act of determining whether the keyword, $KW_i$, for the defect, $D_k$, is to be categorized into the category, $CAT_j$, at 508, and then adds the score or weight, $S_k(i, j)$, to the score or weight of the previous act of determining whether the keyword, $KW_{i-1}$, for the defect, $D_k$, is to be categorized into the same category, $CAT_j$, at 508 during the previous iteration for the act of identifying the keyword.

That is, in some embodiments, the method or the system for automatically classifying a defect into a category performs $S_k(i,j)=S_k(i,j)+S_k(i-1,j)$, where $i=2\sim n$, and n is an integer. In some embodiments, the method or the system for automatically classifying a defect into a category simply sums the respective score or weight as indicated by the equation of $S_k(i,j)=S_k(i,j)+S_k(i-1,j)$, where $i=2\sim n$, and n is an integer. In some embodiments, the method or the system for automatically classifying a defect into a category performs weighted sum of the respective score or weight as indicated by the equation of $S_k(i,j)=\alpha_i*S_k(i,j)+\alpha_{i-1}*S_k(i-1,j)$, where $i=2\sim n$, n is an integer, and $\alpha_i$ denotes a coefficient for determining whether $D_k$ is to be categorized into category, $CAT_j$, based upon $KW_i$. In some embodiments, the coefficients $\alpha_k$ may be zero for a score or weight to eliminate the contribution of the score or weight in the weighted sum of the respective score or weight.

That is, in these embodiments, the respective scores or weights are linearly added for each keyword identified. In some embodiments, the method or the system for automatically classifying a defect into a category identifies or defines a non-linear function or functional, $Function_k[(KW_i)_j]$, for the score or weight of the result of the act of determining whether the defect, $D_k$, is to be categorized into the category, CATj at 512. For example, the method or the system for automatically classifying a defect into a category may determine or define the function or function to be a quadratic function of the keywords such as $Function_k[(KW_i)_j]=\alpha_1*KW_i^2+\alpha_2*KW_{i+1}^2+\alpha_3*KW_i*KW_{i+1}$ in an example with two keywords. In various embodiments, the function or functional may be determined or defined to optimize the categorization results.

In some embodiments, the method or the system for automatically classifying a defect into a category iteratively determines the score or weight, $Function_k[(KW_i)_j]$, for the result of the act of determining whether the defect, Dk, is to be categorized into the category, CATj, based at least in part on the keyword, KWi, and sums the scores or weights among different keywords with respect to the same category in some embodiments at 516, 518, and 520. In some embodiments, the method or the system for automatically classifying a defect into a category may optionally determines whether the defect, Dk, may be categorized into the category, CATj, based on the accumulated score or weight during each iteration of 516. In these embodiments where the method or the system for automatically classifying a defect into a category determines that the accumulated score or weight at a particular step is sufficient for the method or the system to render a deterministic determination at 528, the method or the system terminates the iterative loop process of 516-518-520-528 and proceeds to 526 to continue with subsequent actions.

In some embodiments where the method or the system for automatically classifying a defect into a category determines that the accumulated score during a particular iteration still fails to help the method or the system to render a deterministic determination, the method or the system loops back to 516 to continue the iterative loop processing of 516-518-520-528. In some embodiments where the method or the system for automatically classifying a defect into a category iterates through all the keywords, the method or the system determines whether there exist more keywords to be examined at 522. In some embodiments where the method or the system for automatically classifying a defect into a category determines that there exists at least one more keyword to be examined, the method or the system loops back to 506 to identify the next keyword.

In some embodiments where the method or the system for automatically classifying a defect into a category determines that there exists no more keyword to be examined, the method or the system determines whether there exists at least one more category to examine at 524. In some embodiments where the method or the system for automatically classifying a defect into a category determines that there exists at least one more category to be examined, the method or the system loops back to 504 to identify the next category. In some embodiments where the method or the system for automatically classifying a defect into a category determines that there exists no category to be examined, the method or the system proceeds to 526 to proceed with subsequent actions.

Figure 6:
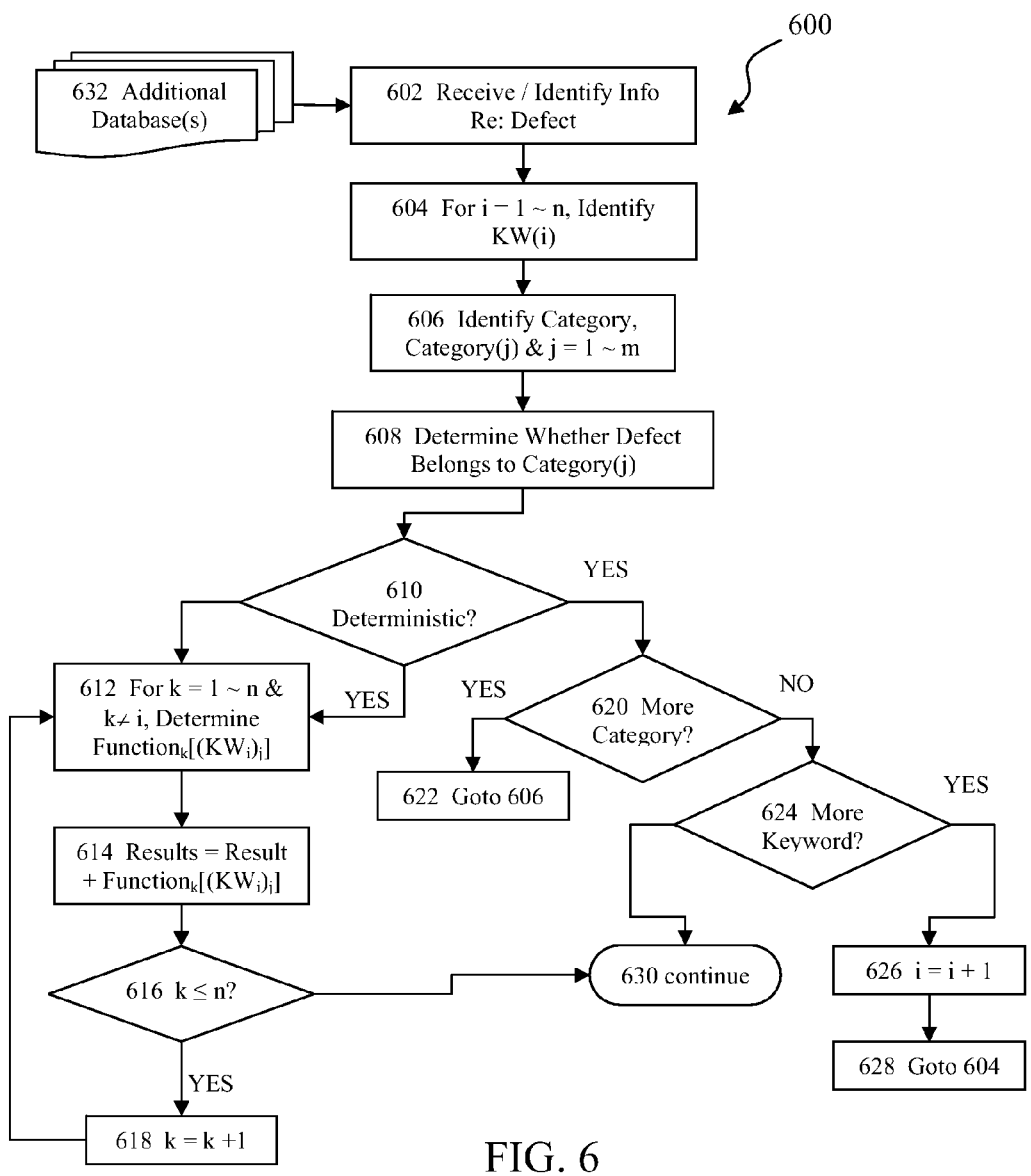
FIG. 6 illustrates more details about the method or system for automatically categorizing defects into one or more categories based at least upon one or more keywords.

Referring to FIG. 6 which illustrates more details about the method or system 600 for automatically categorizing defects into one or more categories based at least upon one or more keywords. At 602, the method or the system for automatically classifying a defect into a category receives or identifies a first information regarding a defect in some embodiments. At 632, the method or the system for automatically classifying a defect into a category optionally accesses one or more additional databases for additional input in some embodiments.

At 604, the method or the system for automatically classifying a defect into a category identifies a keyword, $KW_i$, in some embodiments. At 606, the method or the system for automatically classifying a defect into a category identifies a category, CATj, in some embodiments. At 608, the method or the system for automatically classifying a defect into a category determines whether or not the defect, Dk, may be categorized into the category, CATj in some embodiments. In some embodiments, the method or the system for automatically classifying a defect into a category may associate a score or a weight, $Function_k[(KW_i)_j]$, for the result of the act of determining whether the defect may be categorized into the category. At 610, the method or the system for automatically classifying a defect into a category determines whether the result of the act of determining whether the defect may be categorized into the category is deterministic in some embodiments.

In some embodiments where the method or the system for automatically classifying a defect into a category determines that the result of the act of determining at 608 is not deterministic at 610, the method or the system may associate, define, identify, receive, or determine, at 612, a score or a weight, $Function_k[(KW_i)_j]$, for the result of the act of determining whether the defect, $D_k$, may be categorized into the category, $CAT_j$, based on the keyword, $KW_i$.

At 614, the method or the system for automatically classifying a defect into a category adds the weight or the score, $Function_k[(KW_i)_j]$, to the weight or the score of the result of the previous of determination of whether the defect, $D_k$, may be categorized into the category, $CAT_j$, based on a previously identified keyword, $KW_{i-1}$. That is, the method or the system for automatically classifying a defect into a category performs $Function_k(i,j)=Function_k(i,j)+Function_k(i-1,j)$, where $i=2\sim n$, and n is an integer. In some embodiments, the method or the system for automatically classifying a defect into a category simply sums the respective score or weight as indicated by the equation of $Function_k(i,j)=Function_k(i,j)+Function_k(i-1,j)$, where $i=2\sim n$, and n is an integer.

In some embodiments, the method or the system for automatically classifying a defect into a category performs weighted sum of the respective score or weight as indicated by the equation of $Function_k(i,j)=\alpha_i*Function_k(i,j)+$ $\alpha_{i-1}$*Function$_k$(i−1, j), where i=2~n, n is an integer, and $\alpha_i$ denotes a coefficient for determining whether $D_k$ is to be categorized into category, CAT$_j$, based upon KW$_i$. That is, in these embodiments, the respective scores or weights are linearly added for each keyword identified. In some embodiments, the method or the system for automatically classifying a defect into a category identifies or defines a non-linear function or functional, Function$_k$[(KW$_i$)$_j$], for the score or weight of the result of the act of determining whether the defect, $D_k$, is to be categorized into the category, CAT$_j$ at 612.

For example, the method or the system for automatically classifying a defect into a category may determine or define the function or function to be a quadratic function of the keywords such as Function$_k$[(KW$_i$)$_j$]=$\alpha_1$*KW$_i^2$+$\alpha_2$*KW$_{i+1}^2$+$\alpha_3$*KW$_i$*KW$_{i+1}$ in an example with two keywords. In various embodiments, the function or functional may be determined or defined to optimize the categorization results. At 616, the method or the system for automatically classifying a defect into a category determines whether there exist more keywords to be processed in some embodiments. In some embodiments where the method or the system for automatically classifying a defect into a category determines that there exists no more keyword to be processed, the method or the system proceeds to 630 to continue subsequent actions. In some embodiments where the method or the system for automatically classifying a defect into a category determines that there exist at least one more keyword to be processed at 616, the method or the system loops back to 612 until there exist no more keywords to be processed.

In some embodiments where the method or the system for automatically classifying a defect into a category determines that the result of the act of determining at 608 is deterministic at 610, the method or the system proceeds to 620 to determine whether there exists at least one more category to examine at 620. In some embodiments where the method or the system for automatically classifying a defect into a category determines that there exist at least one more category to examine or process, the method or the system loops back to 606 at 622.

In some embodiments where the method or the system for automatically classifying a defect into a category determines that there exists no more category to examine or process, the method or the system determines whether there exists at least one more keyword to examine or process in categorizing the defect at 624. In some embodiments where the method or the system for automatically classifying a defect into a category determines that there exists no more keyword to process or examine, the method or the system proceeds to 630 to continue subsequent actions. In some embodiments where the method or the system for automatically classifying a defect into a category determines that there exists at least one more keyword to examine or process at 624, the method or the system increments an index for the keyword at 626 and loops back to 604 at 628 to identify the next keyword and repeats the actions as described in various embodiments above.

Figure 7:
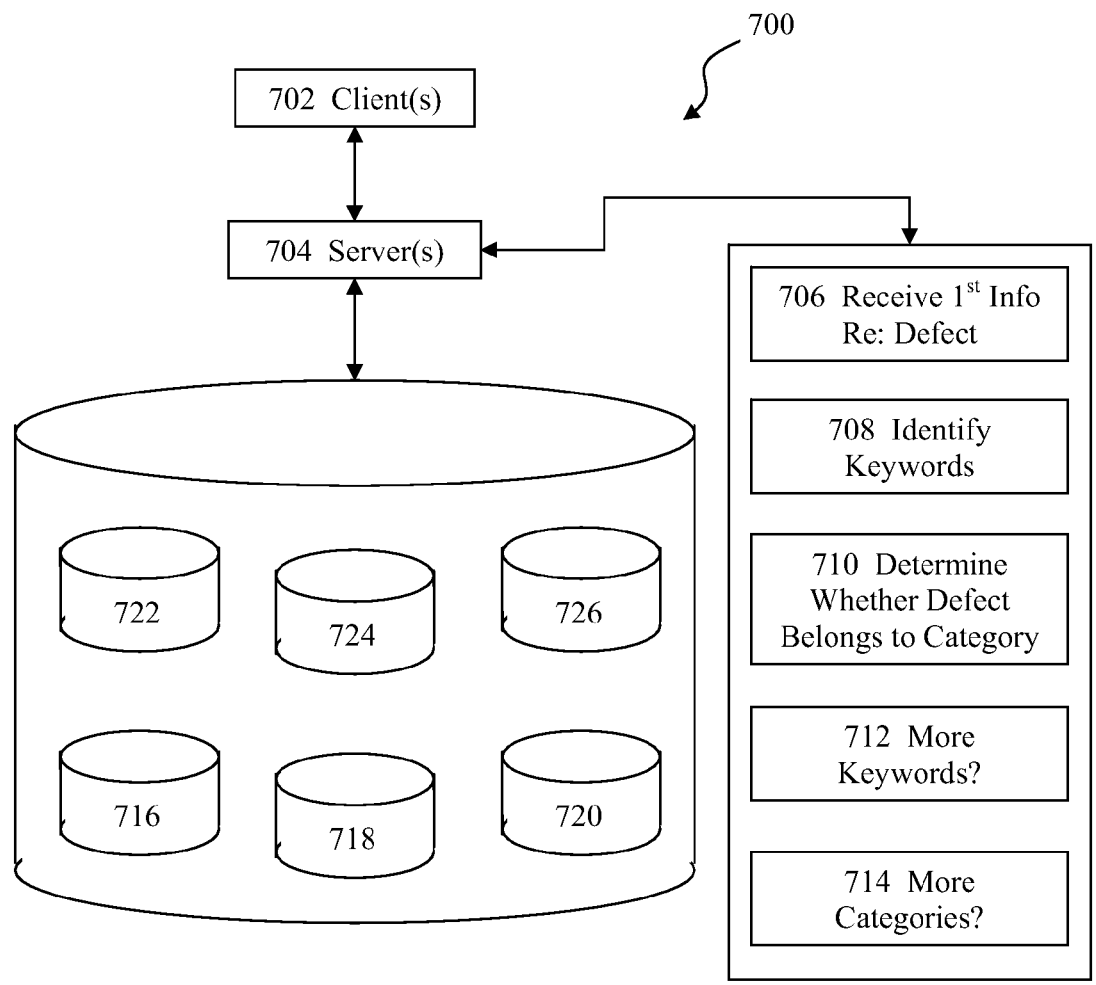
FIG. 7 illustrates details about various actions for the method and modules for the system of client-server-database operation diagram for a method or system for automatically categorizing defects into one or more categories based at least upon one or more keywords.

Referring to FIG. 7 which illustrates details about various actions for the method, 700, and modules for the system, 700, of client-server-database operation diagram for a method or system for automatically categorizing defects into one or more categories based at least upon one or more keywords. In some embodiments, one or more clients 702 communicate with and transmit the defects identified or found on the one or more clients to the server 704. The server 704, on the other hand, may also communicate with and transmit to the one or more clients 702 items comprising, for example, one or more patches or one or more messages indicating that fixes are available.

The server 704 may read from and/or write to one or more databases during its performance of categorizing the identified defects into one or more categories in some embodiments. In some embodiments, the one or more databases comprise one or more defect databases, 716, which comprise, for example, the header data that describe the metadata for the defects. In some embodiments, the one or more defect databases constitute a master database that comprises the data for the defect. In some embodiments, the one or more databases comprise one or more defect detail databases, 718, which constitute one or more child databases and comprise, for example, detailed analytical and/or diagnostic data related to the resolution of the defects.

In some embodiments, the one or more databases comprise one or more category database, 720, which comprise, for example, data related to the categories of defects. In some embodiments, the one or more databases comprise one or more category-defect databases, 722, which comprise, for example, a cross reference table or database that comprises relationships between categories and defects. In some embodiments, the one or more databases further comprise the categorization results. In some embodiments, the one or more databases comprise one or more glossary databases or keyword databases, 724, which comprise, for example, a list of keywords, key phrases, or technical terms which constitute the signatures of various categories.

In some embodiments, the one or more databases comprise one or more category-keyword databases, 726, which comprise, for example, a cross-reference table or database which comprises the relationships between categories and the keywords, key phrases, or the technical terms. In some embodiments, the one or more category-keyword databases comprise the score or weight which may be associated with or assigned to a keyword for a category. In some embodiments, the server also access one or more processes or modules which scan the defect details to match keywords and aggregate or accumulated weights to determine whether a given defect falls into some certain categories.

In some embodiments, the one or more processes or modules may use looping logic to compare each keyword for each category to each defect and make a decision based at least in part upon matching keywords, key phrases, and their respective weights within each category in order to determine if the defect meets the requirements for categorization. For example, the method or the system may require that a defect may be categorized into a category if the aggregate or accumulated weight is equal to or greater than a threshold value such as 100. In some embodiments, the processes or modules are idempotent.

In some embodiments, the processes or modules update the relationships as identified above incrementally. In some embodiments, the processes or modules update the relationships as identified above completely from scratch. In some embodiments, the method or the system for automatically classifying a defect into a category updates any of the above one or more databases when the method or the system categorizes a defect into a category so as to further optimize or tune the accuracy of the method or the system.

In some embodiments, the server 704 invokes one or more processes or modules of the method or the system for automatically classifying a defect into a category in response to one or more defects identified or found on the one or more clients 702. In some embodiments, the one or more processes or modules of the method or the system comprises receiving a first information regarding the one or more defects of 706. In some embodiments, the one or more processes or modules of the method or the system comprises identifying one or more keywords, key phrases, or technical terms from the first information for the one or more defects of 708.

In some embodiments, the one or more processes or modules of the method or the system comprises determining whether one of the one or more defects may be categorized into a category based on the keywords, key phrases, or technical terms identified in the first information of 710. In some embodiments, the one or more processes or modules of the method or the system comprises determining whether or not there exist one or more keywords, key phrases, or technical terms to examine or process of 712. In some embodiments, the one or more processes or modules of the method or the system comprises determining whether there exist one or more categories into which the one or more defects may be categorized.

System Architecture Overview

Figure 8:
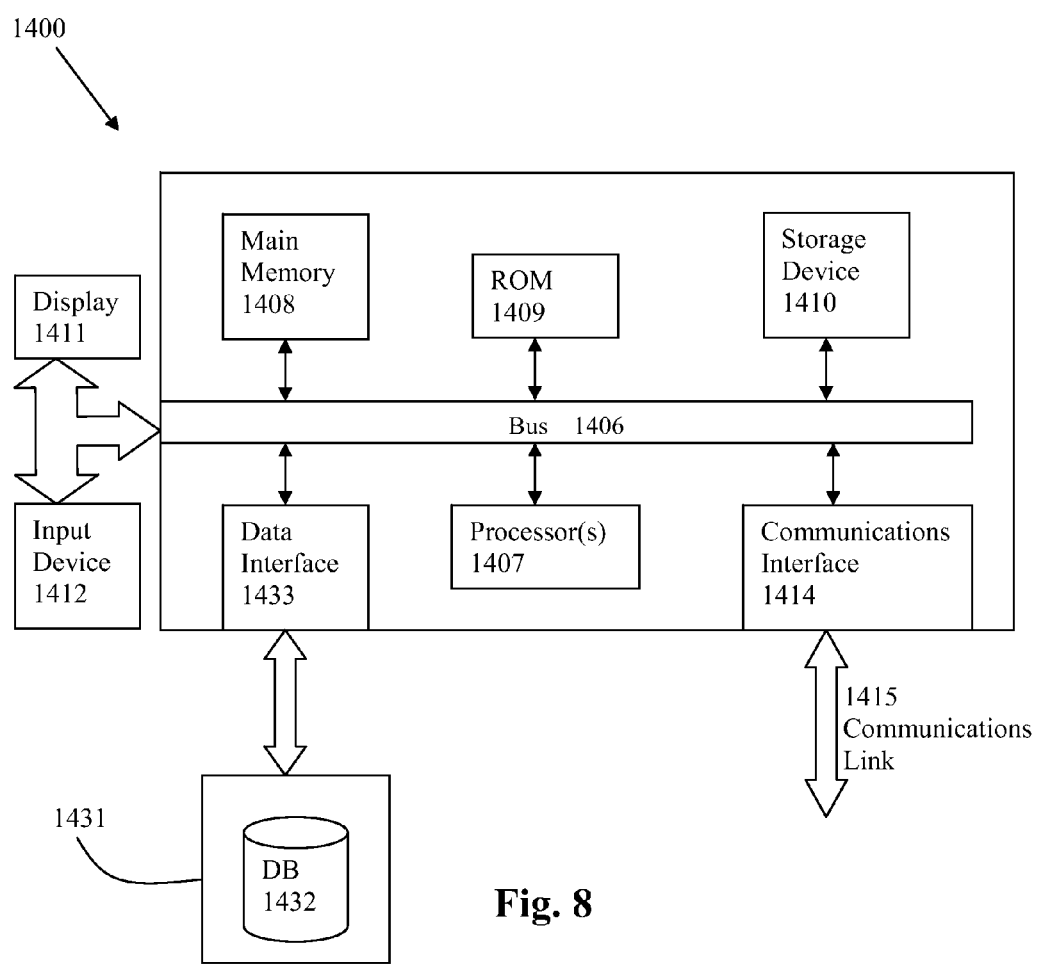
FIG. 8 depicts a computerized system on which a method for timing closure with concurrent process models can be implemented.

FIG. 8 illustrates a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control (not shown).

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media, and volatile media media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Computer system 1400 may also interact with a database system 1432 via a data interface 1433 where the computer system 1400 may store and retrieve information or data of the electronic design into and from the database system.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense. Moreover, unless otherwise explicitly stated, various processes need not be performed in order to achieve the intended purpose(s) in the order as they are described in the foregoing specification. Similarly, unless otherwise explicitly stated, various modules or parts of the system need not be invoked in the order they are described in the foregoing specification in order to achieve the intended purpose(s).

We claim:

1. A machine-implemented method for automatically categorizing software product defects into two or more categories, the method comprising:
    identifying first information regarding a first defect;
    identifying or receiving additional information from a data structure, wherein the additional information is related to an act of categorizing the first defect into a first category, wherein the data structure comprises a rule base which comprises at least one inference rule to mimic a reasoning process of a human expert, and wherein the data structure comprises a keyword database;
    identifying a first keyword for the first defect based at least in part upon the first information;
    identifying a plurality of weights for the first keyword wherein in values for the plurality of weights are specific to a combination of a given keyword and a given category;
    accessing, from the keyword database, a first weight for the first keyword with respect to a first category;
    accessing from the keyword database, a second weight for the first keyword with respect to a second category;
    categorizing the first defect into the first category, based at least in part on the first weight for the first keyword with respect to the first category; and
    categorizing the first defect into the second category based at least in part on the second weight for the first keyword with respect to the second category;
    wherein the second category is distinct different from the first category;
    wherein the first weight is distinct different from the second weight; and
        updating the data structure with a result of an act of categorizing the first defect into the first category.

2. The machine-implemented method of claim 1, further comprising:
    categorizing the first defect into a third category, the third category being distinct from the first category.

3. The machine-implemented method of claim 1, wherein the data structure comprises at least one of, a defect database, a defect detail database, a category database, a category-defect database, or a defect tracking database.

4. The machine-implemented method of claim 1, wherein the additional information from the data structure comprises metadata for the first defect, diagnostic data for the first defect, a description of one or more symptoms of the first defect, an error message caused by the first defect, one or more snippets of a log file or a trace file, an engineer comment about the first defect, or a customer response to or description of the first defect.

5. The machine-implemented method of claim 1, wherein the first information regarding the first defect comprises a service request, a defect report, or a defect analysis report.

6. The machine-implemented method of claim 1, further comprising:
determining if the first defect may be categorized into the first category by further using a second keyword.

7. The machine-implemented method of claim 6, further comprising:
associating a first score for categorizing the first defect into the first category based at least in part on the first keyword and a second score for categorizing the first defect into the first category based at least in part on the second keyword.

8. The machine-implemented method of claim 7, further comprising:
identifying or determining a function describing a relationship between the first score and the second score with respect to the first category for the first defect.

9. The machine-implemented method of claim 8, wherein the function describes the relationship between the first score and the second score by performing a weighted sum for the first score and the second score.

10. The machine-implemented method of claim 8, wherein the function describes a non-linear relationship between the first score and the second score.

11. The machine-implemented method of claim 1, further comprising:
expanding the rule base, wherein a desired result of categorization is not produced.

12. The machine-implemented method of claim 11, wherein the act of expanding the rule base is performed without modifying other programs for categorization.

13. The machine-implemented method of claim 1, further comprising:
a problem solving program for categorization which comprises expertise or expert knowledge of the first defect.

14. The machine-implemented method of claim 13, further comprising:
modifying the problem solving program, wherein a desired result of categorization is not produced.

15. A computer program product comprising a non-transitory computer-usable medium having executable code to execute a process for automatically categorizing software product defects into two or more categories, the process comprising:
identifying first information regarding a first defect;
identifying or receiving addition information from a data structure, wherein the additional information is related to an act of categorizing the first defect into a first category; wherein the data structure comprises a rule base which comprises at least one inference rule to mimic a reasoning process of a human expert, and wherein the data structure comprises a keyword database;
identifying a first keyword for the first defect based at least in part upon the first information;
identifying a plurality of weights for the first keyword wherein values for the plurality of weights are specific to a combination of a given keyword and a given category;
accessing, from the keyword database, a first weight for the first keyword with respect to a first category;
accessing from the keyword database, a second weight for the first keyword with respect to a second category;
categorizing the first defect into the first category, based at least in part on the first weight for the first keyword with respect to the first category; and
categorizing the first defect into the second category, based at least in part on the second weight for the first keyword with respect to the second category;
wherein the second category is distinct different from the first category; and
wherein the first weight is distinct different from the second weight.

16. A system for automatically categorizing software product defects into two or more categories, the system comprising:
a communication module configured for identifying first information regarding a first defect;
a data interface configured for identifying or receiving addition information from a data structure, wherein the additional information is related to an act of categorizing the first defect into a first category, wherein the data structure comprises a rule base which comprises at least one inference rule to mimic a reasoning process of a human expert, wherein the data structure comprises a keyword database;
a processor configured for identifying a first keyword for the first defect based at least in part upon the first information, and identifying or receiving a plurality of weights for the first keyword wherein values for the plurality of weights are specific to a combination of a given keyword and a given category;
the processor or a second processor configured for accessing, from the keyword database, a first weight for the first keyword with respect to a first category;
accessing from the keyword database, a second weight for the first keyword with respect to a second category;
the processor or a third processor configured for categorizing the first defect into the first category, based at least in part on the first weight for the first keyword with respect to the first category; and
the processor or a fourth processor configured for categorizing the first defect into the second category, based at least in part on the second weight for the first keyword with respect to the second category;
wherein the second category is distinct different from the first category;
wherein the first weight is distinct different from the second weight; and
wherein the data structure is undated with a result of an act of categorizing the first defect into the first category.

17. The machine-implemented method of claim 1, wherein the first category is defined when an accumulated weight is equal to or greater than a threshold value.

18. The machine-implemented method of claim 17, wherein the accumulated weight is calculated using a function of both the keyword and the category in a combination, the function being R(i,j) where i denotes an i-th keyword, and j denotes a j-th category.

19. The machine-implemented method of claim 1, further comprising: calculating a first score for categorizing the first defect into the first category based at least in part on the first weight for the first keyword and a second score for categorizing the first defect into the first category based at least in part on the second weight for the first keyword.

20. The computer program product of claim 15, wherein the first category is defined when an accumulated weight is equal to or greater than a threshold value.

21. The computer program product of claim 20, wherein the accumulated weight is calculated using a function of both the keyword and the category in a combination, the function being $R(i, j)$ where i denotes an i-th keyword, and j denotes a j-th category.

22. The computer program product of claim 15, the process further comprising: calculating a first score for categorizing the first defect into the first category based at least in part on the first weight for the first keyword and a second score for categorizing the first defect into the first category based at least in part on the second weight for the first keyword.

23. The computer program product of claim 15, the process further comprising:
    categorizing the first defect into a third category, the third category being distinct from the first category.

24. The computer program product of claim 15, wherein the second category is defined when an accumulated weight is equal to or greater than a threshold value.

25. The computer program product of claim 24, wherein the accumulated weight is calculated using a function of both the keyword and the category in a combination, the function being $R(i, j)$ where i denotes an i-th keyword, and j denotes a j-th category.

26. The system of claim 16, wherein the first category is defined when an accumulated weight is equal to or greater than a threshold value.

27. The system of claim 26, wherein the accumulated weight is calculated using a function of both the keyword and the category in a combination, the function being $R(i, j)$ where i denotes an i-th keyword, and j denotes a j-th category.

28. The method of claim 1, wherein the weight for the first keyword with respect to the first category is determined based at least in part on an analysis of one or more characteristics of the first category.

29. The computer program product of claim 15, wherein the weight for the first keyword with respect to the first category is determined based at least in part on an analysis of one or more characteristics of the first category.

30. The system of claim 16, wherein the weight for the first keyword with respect to the first category is determined based at least in part on an analysis of one or more characteristics of the first category.

* * * * *

UNITED STATES PATENT AND TRADEMARK OFFICE
CERTIFICATE OF CORRECTION

PATENT NO. : 9,020,943 B2
APPLICATION NO. : 12/350217
DATED : April 28, 2015
INVENTOR(S) : Caldwell et al.

It is certified that error appears in the above-identified patent and that said Letters Patent is hereby corrected as shown below:

In the Specification

In column 13, line 49, delete "Dk," and insert -- $D_k$, --, therefor.

In column 13, line 58, delete "$KW_{i-1}$," and insert -- $KW_{i+1}$, --, therefor.

In column 13, line 62, delete "$KW_{i-1}$," and insert -- $KW_{i+1}$, --, therefor.

In column 15, line 29, delete "CATj" and insert -- $CAT_j$ --, therefor.

In column 15, line 40, delete "Dk," and insert -- $D_k$, --, therefor.

In column 15, line 41, delete "CATj," and insert -- $CAT_j$, --, therefor.

In column 15, line 42, delete "KWi," and insert -- $KW_i$, --, therefor.

In column 15, line 47, delete "Dk," and insert -- $D_k$, --, therefor.

In column 15, line 47, delete "CATj," and insert -- $CAT_j$, --, therefor.

In column 16, line 30, delete "CATj," and insert -- $CAT_j$, --, therefor.

In column 16, line 32, delete "Dk," and insert -- $D_k$, --, therefor.

In column 16, line 33, delete "CATj" and insert -- $CAT_j$ --, therefor.

In column 19, lines 49-50, delete "media media." and insert -- media. --, therefor.

In the Claims

In column 22, line 54, in Claim 16, delete "undated" and insert -- updated --, therefor.

In column 24, line 11, in Claim 28, delete "The method of" and insert -- The machine-implemented method of --, therefor.

Signed and Sealed this
Sixteenth Day of February, 2016

Michelle K. Lee
*Director of the United States Patent and Trademark Office*